United States Patent
Lee et al.

(10) Patent No.: US 9,794,799 B2
(45) Date of Patent: Oct. 17, 2017

(54) METHOD AND APPARATUS FOR PERFORMING CARRIER AGGREGATION USING ABS PATTERNS IN MACRO ENB OF WIRELESS COMMUNICATION SYSTEM CONNECTED TO HETEROGENEOUS NETWORK

(71) Applicant: Samsung Electronics Co., Ltd., Gyeonggi-do (KR)

(72) Inventors: Hee-Kwang Lee, Gyeonggi-do (KR); Il-Won Kwon, Seoul (KR); Jung-Ah Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 123 days.

(21) Appl. No.: 14/612,878

(22) Filed: Feb. 3, 2015

(65) Prior Publication Data
US 2015/0223239 A1 Aug. 6, 2015

(30) Foreign Application Priority Data
Feb. 4, 2014 (KR) ........................ 10-2014-0012631

(51) Int. Cl.
*H04W 16/32* (2009.01)
*H04W 72/04* (2009.01)
(Continued)

(52) U.S. Cl.
CPC ........... *H04W 16/32* (2013.01); *H04L 5/0035* (2013.01); *H04L 5/0073* (2013.01); (Continued)

(58) Field of Classification Search
None
See application file for complete search history.

(56) References Cited

U.S. PATENT DOCUMENTS 8,867,373 B2 * 10/2014 Dimou ................ H04W 76/027
370/242
2013/0114455 A1 5/2013 Yoo et al.
(Continued)

FOREIGN PATENT DOCUMENTS

WO  WO 2013/048569  4/2013

OTHER PUBLICATIONS

NTT Docomo, "Performance Evaluation of ICIC for SCE", R1-133459, 3GPP TSG RAN WG1 Meeting #74, Aug. 19-23, 2013.
(Continued)

*Primary Examiner* — Bunjob Jaroenchonwanit
(74) *Attorney, Agent, or Firm* — The Farrell Law Firm, P.C.

(57) ABSTRACT

Methods and apparatuses are provided for performing carrier aggregation (CA) using a plurality of almost blank subframe (ABS) patterns in a macro enhanced Node B (eNB) of a wireless communication system connected to a heterogeneous network. An ABS pattern having a different pattern is determined for each component carrier (CC), when two or more carriers are deployed in each of the macro eNB and at least one small cell eNB. A serving cell for each user equipment (UE) is determined for each CC, from among a macro cell and a small cell. CA is performed for data transmission to each UE using the determined ABS pattern, in accordance with each determined serving cell.

18 Claims, 14 Drawing Sheets

(51) Int. Cl.
 *H04L 5/00* (2006.01)
 *H04B 17/318* (2015.01)
 *H04W 72/08* (2009.01)

(52) U.S. Cl.
 CPC ....... *H04W 72/0426* (2013.01); *H04B 17/318* (2015.01); *H04L 5/001* (2013.01); *H04W 72/082* (2013.01)

(56) References Cited

U.S. PATENT DOCUMENTS

| | | | | |
|---|---|---|---|---|
| 2013/0242924 A1* | 9/2013 | Kim | .................... | H04W 72/042 370/329 |
| 2013/0294383 A1* | 11/2013 | Zhang | .................... | H04L 5/001 370/329 |
| 2014/0023009 A1* | 1/2014 | Abe | .................... | H04W 24/10 370/329 |
| 2014/0233457 A1* | 8/2014 | Koutsimanis | .......... | H04J 11/005 370/328 |
| 2014/0321296 A1* | 10/2014 | Balraj | .................... | H04L 5/0032 370/252 |
| 2015/0065108 A1* | 3/2015 | Bedekar | ................ | H04W 24/02 455/418 |
| 2015/0103784 A1* | 4/2015 | Lorca Hernando | ... | H04L 5/0032 370/329 |
| 2015/0156724 A1* | 6/2015 | Clausen | ............ | H04W 52/0238 370/252 |
| 2015/0223239 A1* | 8/2015 | Lee | ........................ | H04W 16/32 370/329 |
| 2015/0223265 A1* | 8/2015 | Fwu | ........................ | H04W 52/04 370/329 |
| 2015/0358105 A1* | 12/2015 | Jung | .................... | H04J 11/0056 370/329 |
| 2015/0372779 A1* | 12/2015 | Lim | ........................ | H04J 11/005 370/338 |
| 2016/0036541 A1* | 2/2016 | Siomina | ............... | H04B 17/345 455/422.1 |

OTHER PUBLICATIONS

NSN, Nokia Corporation, "Performance of Bearer Split with Non-ideal Backhaul", R2-132340, 3GPP TSG-RAN wG2 Meeting #83, Aug. 19-23, 2013.
Samsung, "Inter-frequency eICIC Enhancements for Rel 11.0", R2-121498, 3GPP TSG-AN2#77Bis meeting, Mar. 26-30, 2012.
European Search Report dated May 7, 2015 issued in counterpart application No. 15153758.6-1854.

* cited by examiner

METHOD AND APPARATUS FOR PERFORMING CARRIER AGGREGATION USING ABS PATTERNS IN MACRO ENB OF WIRELESS COMMUNICATION SYSTEM CONNECTED TO HETEROGENEOUS NETWORK

PRIORITY

This application claims priority under 35 U.S.C. §119(a) to a Korean Patent Application filed on Feb. 4, 2014 in the Korean Intellectual Property Office and assigned Serial Number 10-2014-0012631, the content of which is incorporated herein by reference.

BACKGROUND OF THE INVENTION

1. Field of the Invention

The present invention relates generally to carrier aggregation (CA) in a heterogeneous network (HetNet), and more particularly, to maximizing a throughput on the heterogeneous network by applying of a plurality of almost blank subframe (ABS) patterns.

2. Description of the Related Art

To increase the coverage and capacity of a macro BS only network, a HetNet is provided, which arranges small cell enhanced nodes B (eNBs) having low power, such as remote radio head (RRH) nodes, pico nodes, femto nodes, and relay nodes in a macro cellular network. The HetNet can improve space re-use effects through cell splitting. However, the HetNet can cause a serious inter-cell interference problem due to a great difference in the transmission (Tx) powers of a macro eNB and a small cell eNB. Accordingly, the HetNet requires new cell association and inter-cell interference coordination (ICIC) technologies for its efficient use. A method has been provided for offloading macro user equipments (UEs) to a small cell eNB and expanding a range of the small cell eNB in order to improve the capacity and fairness of the HetNet.

In order to expand the range of the small cell eNB, a method has also been provided for connecting each UE to a macro eNB or a small cell eNB, sending the greatest downlink (DL) received signal strength (RSS) identically with the macro BS only network, and increasing Tx power of the small cell eNB. However, as a result of this method, UEs located in an expanded area of the small cell eNB and UEs accessed the macro eNB can suffer serious interference.

In order to expand the range of the small cell eNB, another method has been provided for giving a positive offset (i.e., a range expansion bias) to DL RSS of a small cell eNB and enabling UEs receiving greater DL RSS from a macro eNB but being located closer to the small cell eNB to be connected to the small cell eNB. This method expands the range of the small cell eNB without increasing Tx power of the small cell eNB. However, as a result of this method UEs located in an expanded area of the small cell eNB, specifically, UEs accessing the small cell eNB suffer serious inter-cell interference from the macro eNB sending stronger DL RSS than the small cell eNB. Thus, when a macro UE is located in a boundary of a macro cell, the range expansion of the small cell eNB can improve the capacity of the macro cell due to offloading of the macro UE to the small cell eNB. However, when a small cell UE is located in a range expansion area of the small cell eNB, the range expansion of the small cell eNB can deteriorate overall sum capacity due to the low link performance of the small cell UE. Also, the macro UEs cannot be serviced at a macro ABS pattern for small cell range expansion.

SUMMARY OF THE INVENTION

The present invention has been made to address at least the above problems and/or disadvantages and to provide at least the advantages described below. Accordingly, an aspect of the present invention provides a method and an apparatus for performing CA using a plurality of ABS patterns in a macro eNB of a wireless communication system.

Another aspect of the present invention provides a method and an apparatus for performing CA and ICIC using a plurality of different ABS patterns in a HetNet which deploys a macro cell eNB and a small cell eNB.

According to an embodiment of the present invention, a method is provided for performing CA using a plurality of ABS patterns in a macro eNB of a wireless communication system connected to a heterogeneous network. An ABS pattern having a different pattern is determined for each component carrier (CC), when two or more carriers are deployed in each of the macro eNB and at least one small cell eNB. A serving cell for each UE is determined for each CC, from among a macro cell and a small cell. CA is performed for data transmission to each UE using the determined ABS pattern, in accordance with each determined serving cell.

According to another embodiment of the present invention, a method is provided for performing CA using a plurality of ABS patterns in a macro eNB of a wireless communication system connected to a heterogeneous network. An ABS pattern having a different pattern is determined for each small cell eNB, when a different carrier is deployed in each of the macro eNB and at least one small cell eNB. A serving cell of a user equipment (UE) is determined from among a macro cell and a small cell. CA is performed for data transmission to the UE in the macro eNB and the small cell eNB using the determined ABS pattern, in accordance with the determined serving cell.

According to an additional embodiment of the present invention, an apparatus is provided for performing CA using a plurality of ABS patterns in a macro eNB of a wireless communication system connected to a heterogeneous network. The apparatus includes an ABS pattern determining unit for determining an ABS pattern having a different pattern for each CC, when two or more carriers are deployed in each of the macro eNB and at least one small cell eNB. The apparatus also includes a serving cell determining unit for determining a serving cell for each UE from among a macro cell and small cell for each CC. The apparatus further includes a CA control unit for performing CA for data transmission to each UE using the determined ABS pattern, in accordance with each determined serving cell.

According to a further embodiment of the present invention, an apparatus is provided for performing CA using a plurality of ABS patterns in a macro eNB of a wireless communication system connected to a heterogeneous network. The apparatus includes an ABS pattern determining unit for determining an ABS pattern having a different pattern for each small cell eNB, when a different carrier is deployed in each of the macro eNB and at least one small cell eNB. The apparatus also includes a serving cell determining unit for determining a serving cell of a UE from among a macro cell or and small cell. The apparatus further includes a CA control unit for performing CA for data transmission to the UE in the macro eNB and the small eNB using the determined ABS pattern, in accordance with the determined serving cell.

BRIEF DESCRIPTION OF THE DRAWINGS

The above and other aspects, features, and advantages of the present invention will more apparent from the following detailed description when taken in conjunction with the accompanying drawings in which.

DETAILED DESCRIPTION OF THE EMBODIMENTS OF THE PRESENT INVENTION

Figure 1:
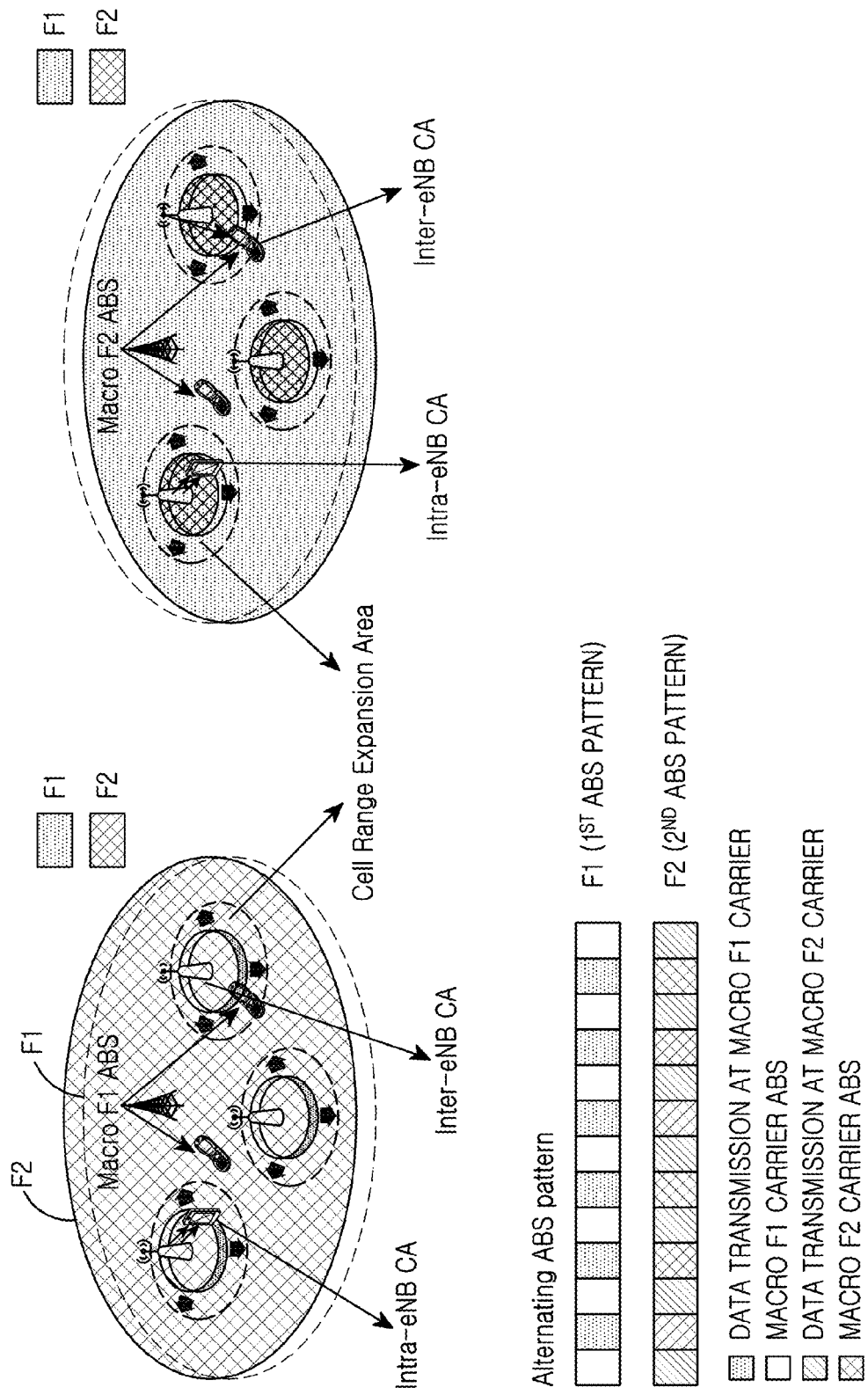
FIG. 1 is a diagram illustrating a method of simultaneously managing eICIC and CA by applying a different ABS pattern by a CC to a macro eNB in a HetNet deploying carriers frequency 1 (F1) and frequency 2 (F2) in each of the macro eNB and small cell eNBs, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

CA is a technology in which an eNB and a UE simultaneously transmit/receive data through two or more carrier frequencies, thereby increasing a data rate per UE. Meanwhile, eICIC is a technology for coordinating mutual interference in a HetNet having a macro eNB and a small cell eNB. Specifically, eICIC enables only the small cell eNB to transmit data without transmitting by the macro eNB a portion of a transmission time duration using an ABS pattern, thereby minimizing interference between a macro cell and a small cell.

FIG. 1 is a diagram illustrating a method of simultaneously managing eICIC and CA by applying a different ABS pattern by a CC to a macro eNB in a HetNet deploying carriers F1 and F2 in each of the macro eNB and small cell eNBs, in accordance with an embodiment of the present invention. The ABS pattern for each CC of the macro eNB is set such that a normal subframe of the ABS pattern and an ABS alternate cross with each other.

Figure 2:
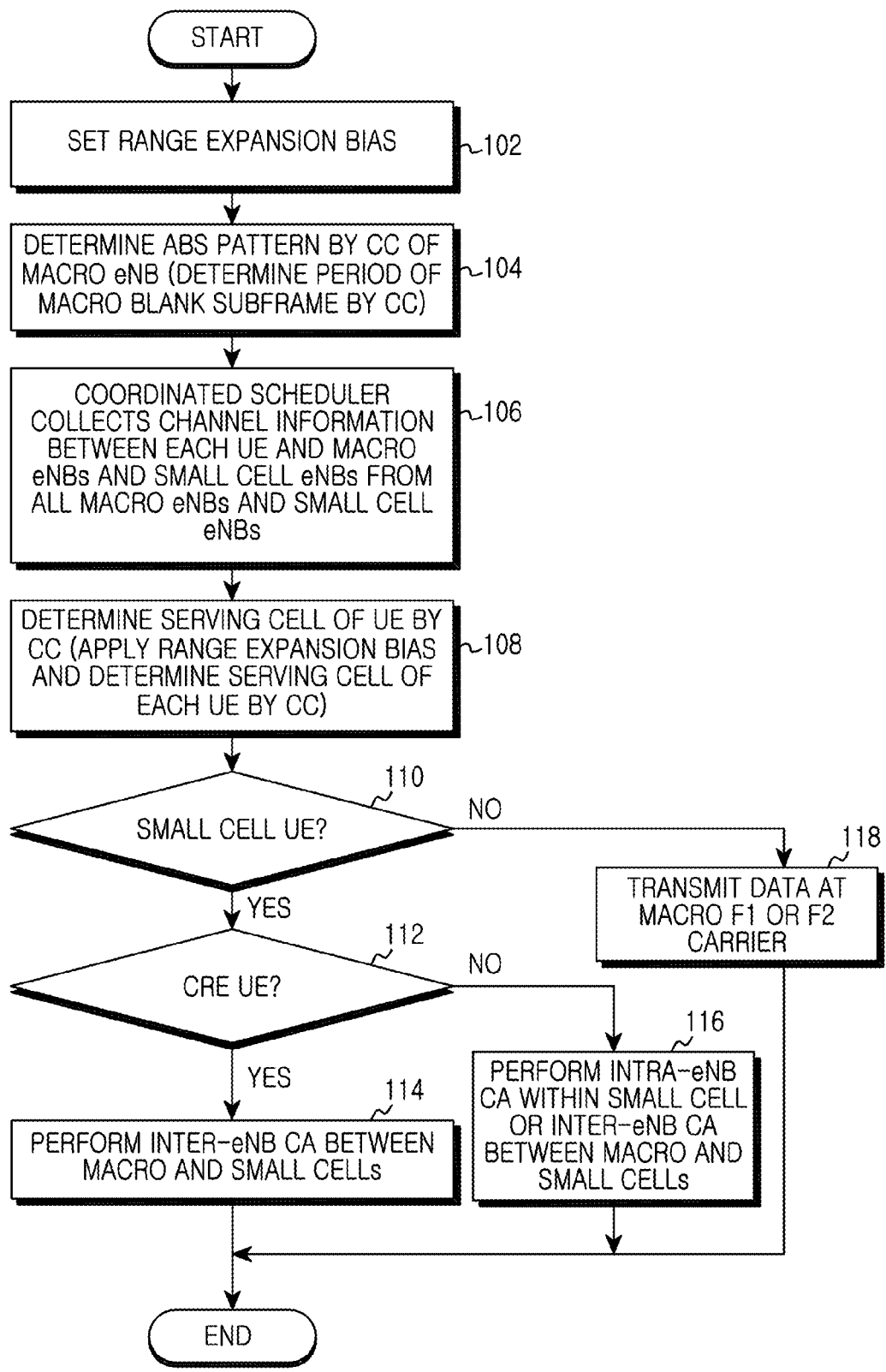
FIG. 2 is a flowchart illustrating a method for simultaneously managing eICIC and CA, according to an embodiment of the present invention illustrated in FIG. 1.

FIG. 2 is a flowchart illustrating a method for simultaneously managing eICIC and CA, according to an embodiment of the present invention illustrated in FIG. 1.

In step 102, a coordinated scheduler or a macro eNB sets a range expansion bias of each small cell. The range expansion bias of the small cell is determined in consideration of the coverage of the macro eNB, the number of arranged small cell eNBs, a transmission (Tx) power of the macro eNB and the small cell eNBs, and the like. The coordinated scheduler may be comprised in the macro eNB, or may be network node which manages a plurality of eNBs.

The cell range expansion of the small cell eNB refers to a method of giving a positive offset (i.e., the range expansion bias) to downlink (DL) received signal strength (RSS) of the small cell eNB in a cell selection procedure, and enabling UEs receiving stronger DL RSS from the macro eNB but being located closer to the small cell eNB to be connected to the small cell eNB, thereby expanding the range of the small cell eNB without increasing the Tx power of the small cell eNB. A reference signal received power (RSRP) or a Reference signal received quality (RSRQ) may be used as the DL RSS for cell selection.

In step 104, the coordinated scheduler determines an ABS pattern for each CC of each macro eNB. That is, the coordinated determines a period of turning off (or blanking) data transmission of the macro eNB. A macro F1 carrier and a macro F2 carrier are set to have ABS patterns alternating with each other. Specifically, at the time of data transmission at the macro F1 carrier, the macro F2 carrier is set as a blank, and at the time of data transmission at the macro F2 carrier, the macro F1 carrier is set as a blank. As one example, the macro F1 carrier and the macro F2 carrier may be set to have ABSs alternating every subframe. In accordance with a management method, the coordinated scheduler may also transmit data at low power without fully turning off (i.e., blanking) data transmission of the macro eNB at a macro blank subframe.

In step 106, the coordinated scheduler collects channel information between each UE and macro eNBs and small cell eNBs from all the macro eNBs and the small cell eNBs. For the sake of the channel information collection and coordinated scheduling of the macro eNBs and the small cell eNBs, the coordinated scheduler may be connected with all the macro eNBs and the small cell eNBs by an optic or Ethernet backhaul and the like.

In step 108, the coordinated scheduler determines a serving cell of each UE. When determining the serving cell, i.e., serving eNB, the coordinated scheduler determines the serving cell by applying the range expansion bias of the small cell eNB set in step 102. Small cell UEs are determined to be located in the range expansion area of the small cell eNB expanded by the range expansion bias, as set forth in Equation (1) below.

$$S=\{i|(RSS_{i,Small})_{dB}<(RSS_{i,Macro})_{dB}, (RSS_{i,Small})_{dB}+ \text{Offset}_{RE\_Bias}>(RSS_{i,Macro})_{dB}\} \quad (1)$$

For performance improvement, at a macro F1 carrier ABS, i.e., at the time of data transmission at a macro F2 carrier, a cell range expansion (CRE) UE of a small cell F2 carrier is excluded from a scheduling candidate and, at a macro F2 carrier ABS, i.e., at the time of data transmission at a macro F1 carrier, a CRE UE of a small cell F1 carrier is excluded from the scheduling candidate.

In step 110, it is determined whether the scheduled UE is the small cell UE. If the scheduled UE is the small cell UE, it is determined whether the scheduled UE is the CRE UE, in step 112.

If the scheduled UE is the CRE UE, the coordinated scheduler performs inter-eNB CA between macro and small cells, in step 114. Here, the inter-eNB CA represents CA between non-colocated eNBs. For example, the inter-eNB CA represents CA between the macro F1 carrier and the small cell F2 carrier with respect to a UE located in a small cell range expansion area.

If the scheduled UE is not the CRE UE, the coordinated scheduler performs intra-eNB CA within a small cell or performs inter-eNB CA between macro and small cells, in step 116. Here, the intra-eNB CA represents CA between colocated eNBs. For example, the intra-eNB CA represents CA between the small cell F1 carrier and the small cell F2 carrier with respect to a UE located in a small cell area.

If it is determined that the scheduled UE is not the small cell UE in step 110, at a macro F2 carrier ABS, the coordinated scheduler transmits data to a macro UE through the macro F1 carrier and, at a macro F1 carrier ABS, transmits data to the macro UE through the macro F2 carrier, in step 118.

Figure 3:
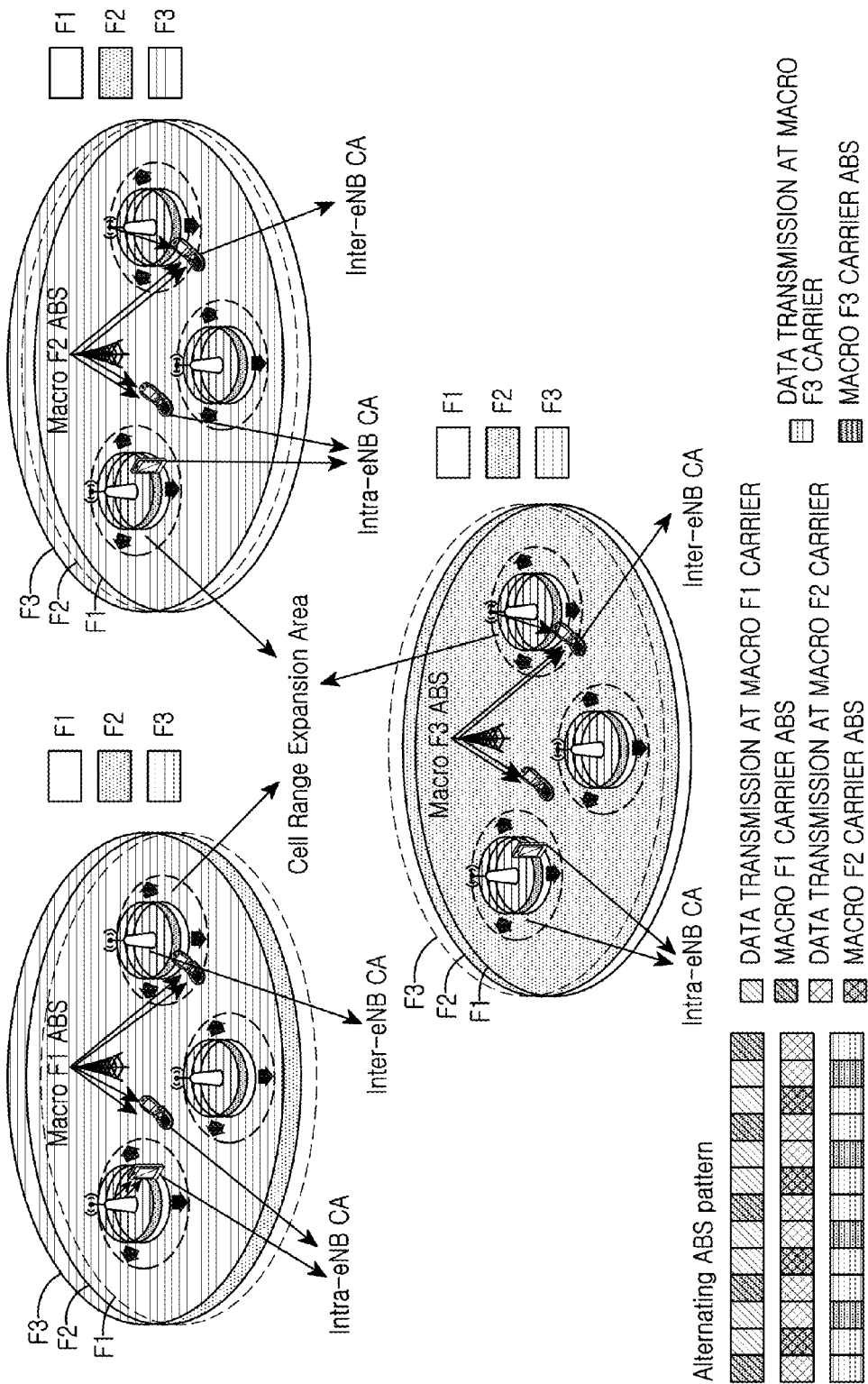
FIG. 3 is a diagram illustrating a method of simultaneously managing eICIC and CA by applying a different ABS pattern by CC to a macro eNB in a heterogeneous network deploying carriers F1, F2, and frequency 3 (F3) in each of the macro eNB and small cell eNBs, according to an embodiment of the present invention.

FIG. 3 is a diagram illustrating a method for simultaneously managing eICIC and CA by applying a different ABS pattern for each CC to a macro eNB in a HetNet deploying F1, F2, and F3 carriers in each of the macro eNB and small cell eNBs, in accordance with an embodiment of the present invention. The ABS pattern for each CC of the macro eNB is set such that a normal subframe of the ABS pattern and an ABS alternate cross with each other.

Figure 4:
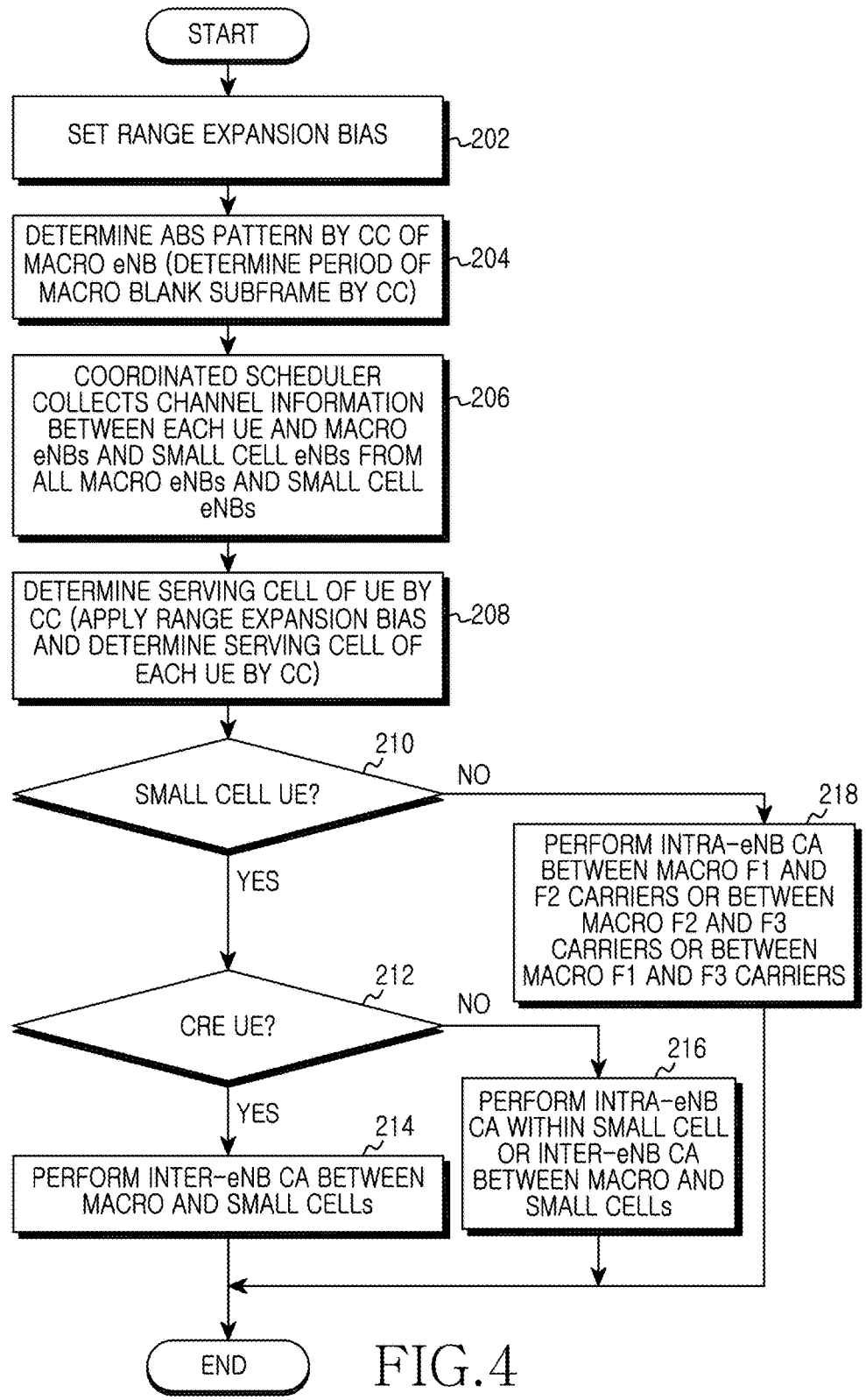
FIG. 4 is a flowchart illustrating a method for simultaneously managing eICIC and CA, according to an embodiment of the present invention illustrated in FIG. 3.

FIG. 4 is a flowchart illustrating a method for simultaneously managing eICIC and CA, according to an embodiment of the present invention illustrated in FIG. 3.

In step 202, a coordinated scheduler or a macro eNB sets a range expansion bias of each small cell. The cell range expansion bias of the small cell is determined in consideration of the coverage of the macro eNB, the number of arranged small cell eNBs, transmission (Tx) power of the macro eNB and the small cell eNBs, and the like. The range expansion of the small cell eNB refers to a method of giving a positive offset (i.e., the range expansion bias) to DL RSS of the small cell eNB in a cell selection procedure and enabling UEs receiving stronger DL RSS from the macro eNB but being located closer to the small cell eNB to be connected to the small cell eNB, thereby expanding the cell range of the small cell eNB without increasing the Tx power of the small cell eNB. Also, as the DL RSS for cell selection, an RSRP or an RSRQ may be used. The coordinated scheduler may be comprised in the macro eNB, or may be network node which manages a plurality of eNBs.

In step 204, the coordinated scheduler determines an ABS pattern of each macro eNB. That is, the coordinated scheduler determines a period of turning off (or blanking) data transmission of the macro eNB. Here, a macro F1 carrier, a macro F2 carrier, and a macro F3 carrier are set to have ABS patterns alternating with one another. In other words, at the time of data transmission at the macro F1 carrier, the macro F2 and F3 carriers are set as blank, and at the time of data transmission at the macro F1 and F2 carriers, the macro F3 carrier is set as a blank. As one example, the ABS patterns of the macro carriers may be set as (1, Off, On, On), (2, On, Off, On), and (3, On, On, Off) of (TTI, macro F1 carrier, macro F2 carrier, macro F3 carrier). In accordance with a management method, the coordinated scheduler may also transmit data at low power without fully turning off (i.e., blanking) data transmission of the macro eNB at a macro blank subframe.

In step 206, the coordinated scheduler collects channel information between each UE and macro eNBs and small cell eNBs from all the macro eNBs and the small cell eNBs. Here, for the sake of the channel information collection and coordinated scheduling of the macro eNBs and the small cell eNBs, the coordinated scheduler may be connected with all the macro eNBs and the small cell eNBs by an optic or Ethernet backhaul and the like.

In step 208, the coordinated scheduler determines a serving cell of each UE. When determining the serving cell, i.e., serving eNB, the coordinated scheduler determines the serving cell by applying the range expansion bias of the small cell eNB set in step 202. Small cell UEs are determined to be located in the range expansion area of the small cell eNB expanded by the range expansion bias in accordance with Equation (1) above.

For performance improvement, at a macro F1 carrier ABS, i.e., at the time of data transmission at macro F2 and F3 carriers, CRE UEs of small cell F2 and F3 carriers are excluded from a scheduling candidate, and, at a macro F2 carrier ABS, i.e., at the time of data transmission at macro F1 and F3 carriers, CRE UEs of small cell F1 and F3 carriers are excluded from the scheduling candidate, and, at a macro F3 carrier ABS, i.e., at the time of data transmission at macro F1 and F2 carriers, CRE UEs of small cell F1 and F2 carriers are excluded from the scheduling candidate.

In step 210, it is determined whether a scheduled UE is the small cell UE. If the scheduled UE is the small cell UE, it is determined whether the scheduled UE is the CRE UE, in step 212.

If it is determined that the scheduled UE is the CRE UE, the coordinated scheduler performs inter-eNB CA between macro and small cells, in step 214. Here, the inter-eNB CA represents CA between non-colocated eNBs. For example, the inter-eNB CA represents CA between the macro F1 and F2 carriers and the small cell F2 carrier with respect to a UE located in a small cell range expansion area.

If it is determined that the scheduled UE is not the CRE UE, the coordinated scheduler performs intra-eNB CA within a small cell or performs inter-eNB CA between macro and small cells, in step 216. Here, the intra-eNB CA represents CA between colocated eNBs. For example, the intra-eNB CA represents CA among the small cell F1 carrier, the small cell F2 carrier, and the small cell F3 carrier with respect to a UE located in a small cell area.

If it is determined that the scheduled UE is not the small cell UE in step 210, the coordinated scheduler performs intra-eNB CA between the macro F1 carrier and the macro F2 carrier at a macro F3 carrier ABS with respect to a macro UE, or performs intra-eNB CA between the macro F1 carrier and the macro F3 carrier at a macro F2 carrier ABS, or performs intra-eNB CA between the macro F2 carrier and the macro F3 carrier at a macro F1 carrier ABS, in step 218.

Figure 5:
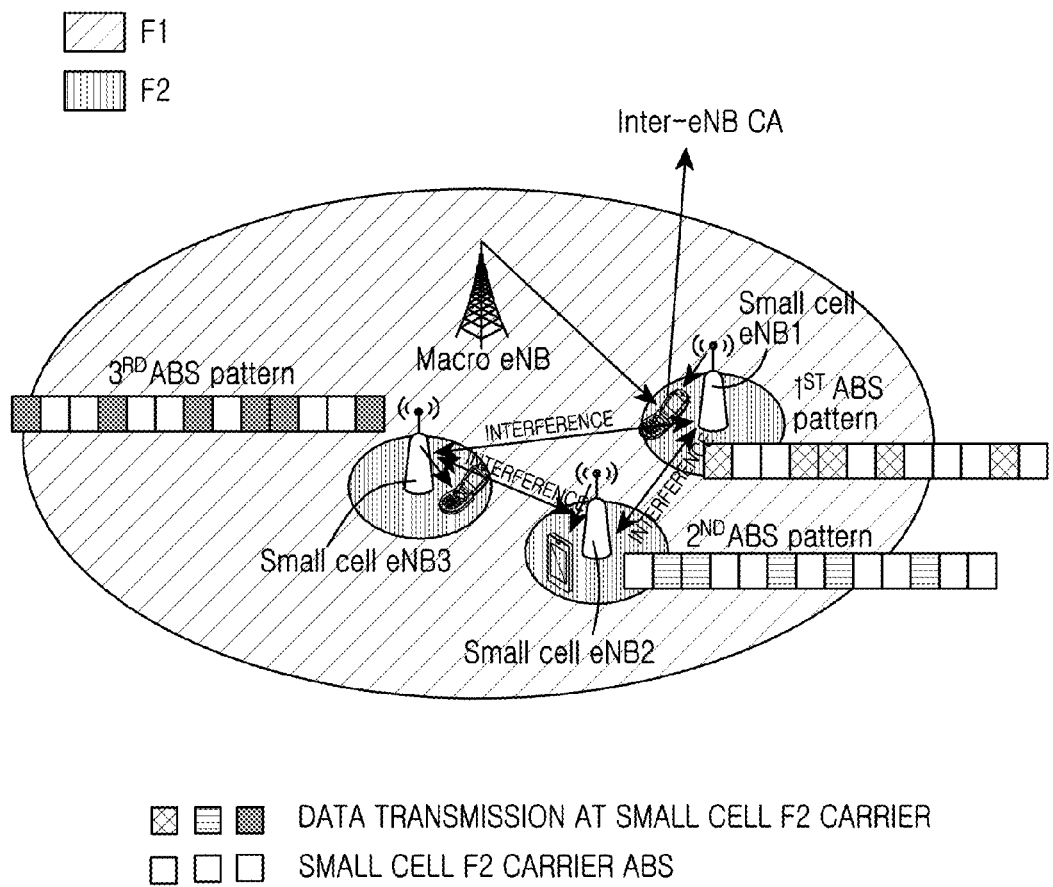
FIG. 5 is a diagram illustrating a method of simultaneously managing eICIC and CA by applying a different ABS pattern by CC to small cell eNBs in a heterogeneous network deploying a different carrier in each of a macro eNB and the small cell eNBs, according to an embodiment of the present invention.

FIG. 5 is a diagram illustrating a method of simultaneously managing eICIC and CA by applying a different ABS pattern for each CC to small cell eNBs in a HetNet deploying a different carrier in each of a macro eNB and the small cell eNBs, in accordance with an embodiment of the present invention. For the sake of interference coordination between small cells, ABS patterns of the small cell eNBs are set to be maximally orthogonal with ABS patterns of dominant interference small cells.

Figure 6:
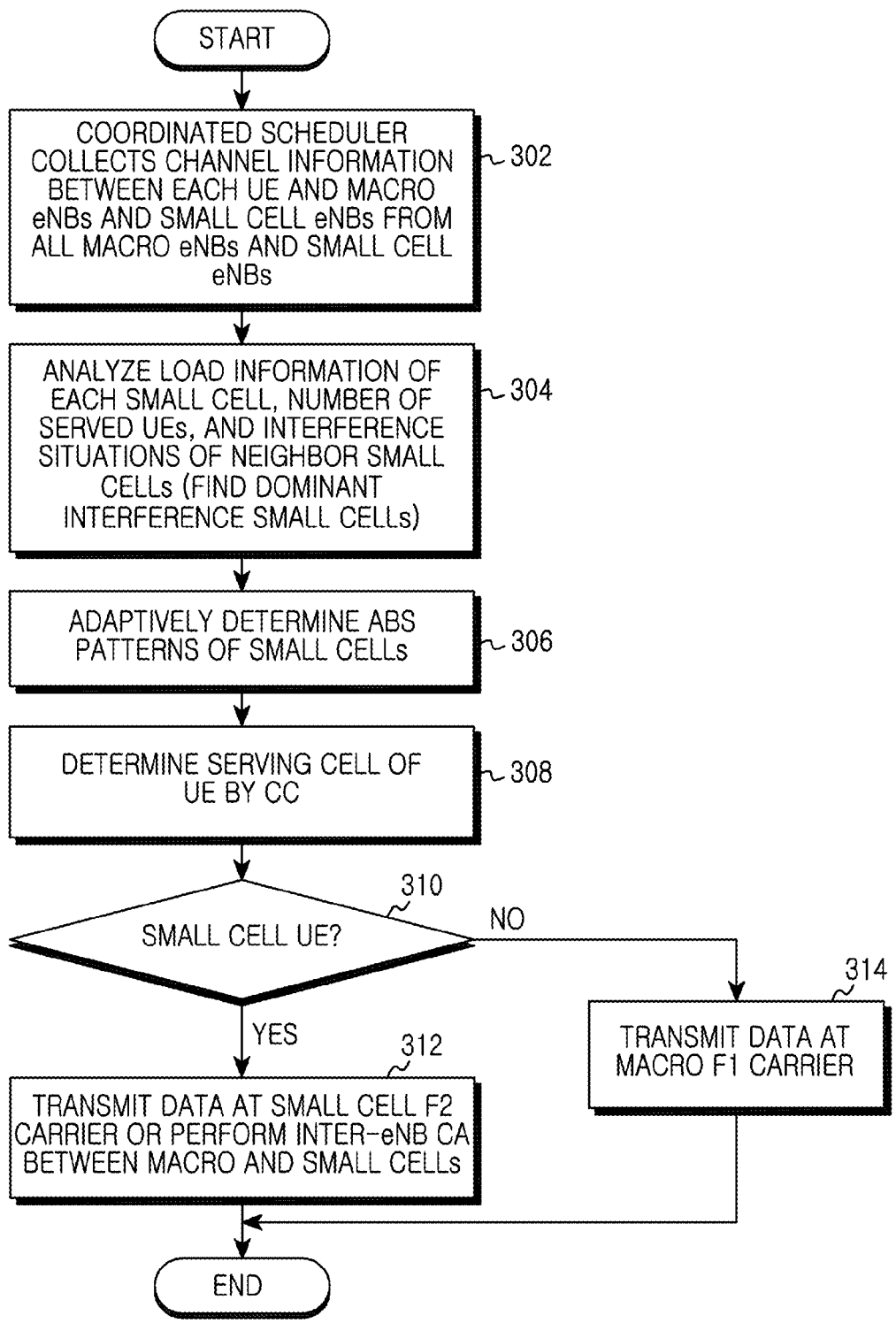
FIG. 6 is a flowchart illustrating a method for simultaneously managing eICIC and CA, according to an embodiment of the present invention illustrated in FIG. 5.

FIG. 6 is a flowchart illustrating a method for simultaneously managing eICIC and CA, according to an embodiment of the present invention illustrated in FIG. 5.

In step 302, a coordinated scheduler or a macro eNB collects channel information between each UE and macro eNBs and small cell eNBs from all the macro eNBs and the small cell eNBs. For the sake of the channel information collection and coordinated scheduling of the macro eNBs and the small cell eNBs, the coordinated scheduler may be connected with all the macro eNBs and the small cell eNBs by an optic or Ethernet backhaul and the like. The coordinated scheduler may be comprised in the macro eNB, or may be network node which manages a plurality of eNBs.

In step 304, the coordinated scheduler analyzes load information of each small cell, the number of served UEs, and interference situations of neighbor small cells. That is, the coordinated scheduler finds dominant interference small cells by small cell UE.

In step 306, the coordinated scheduler determines an ABS pattern of each small cell. That is, the coordinated scheduler determines a period of turning off (or blanking) data transmission of the small cell eNB. The ABS pattern of each small cell is adaptively applied in a semi-static fashion in accordance to load information of own small cell, the number of served UEs, and interference situations of neighbor small cells. The coordinated scheduler sets the ABS pattern of each small cell to be maximally orthogonal with ABS patterns of the dominant interference small cells. In other words, the coordinated scheduler sets the ABS patterns of its own small cell and the dominant interference small cells maximally alternating with one another, thereby minimizing mutual interference between the small cells. In accordance with an embodiment of the present invention, the coordinated scheduler may transmit data at low power without fully turning off (i.e., blanking) data transmission of small cell eNBs at a small cell blank subframe.

In step 308, the coordinated scheduler determines a serving cell of each UE.

In step 310, it is determined whether a scheduled UE is the small cell UE. If the scheduled UE is the small cell UE, the coordinated scheduler transmits data to the small cell UE through a small cell F2 carrier, or performs inter-eNB CA between macro and small cells, in step 312.

If the scheduled UE is not the small cell UE, the coordinated scheduler transmits data to a macro UE through a macro F1 carrier, in step 314.

Figure 7:
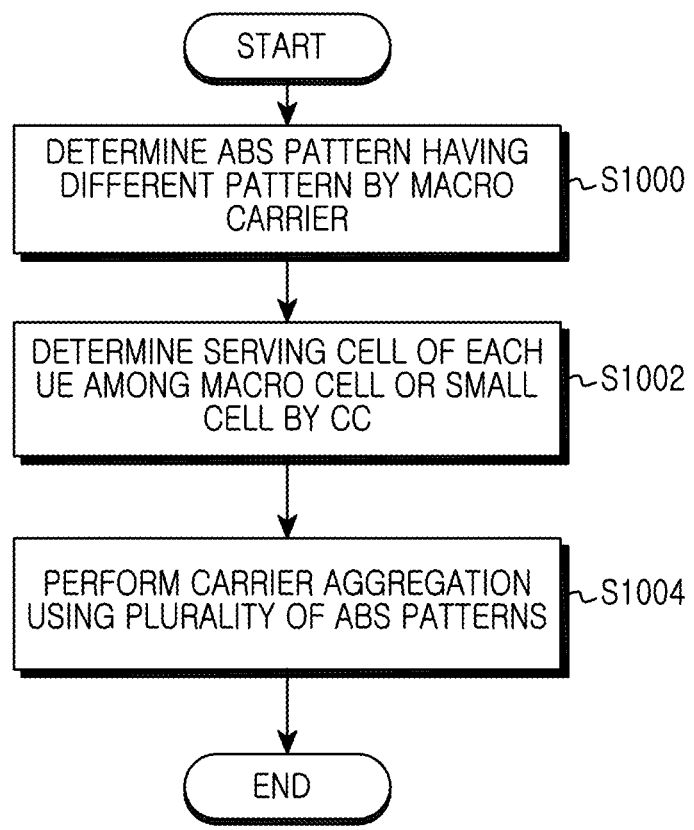
FIG. 7 is a flowchart illustrating a method for performing CA using a plurality of ABS patterns in a macro eNB of a wireless communication system connected to a HetNet, according to an embodiment of the present invention.

FIG. 7 is a flowchart illustrating a method of performing CA using a plurality of ABS patterns in a macro eNB of a wireless communication system connected to a HetNet, according to an embodiment of the present invention.

When two or more different carriers are deployed in each of a macro eNB and at least one or more small cell eNBs, a coordinated scheduler or the macro eNB determines an ABS pattern having a different pattern for each CC, in step S1000. The coordinated scheduler may be comprised in the macro eNB, or may be network node which manages a plurality of eNBs.

Figure 8:
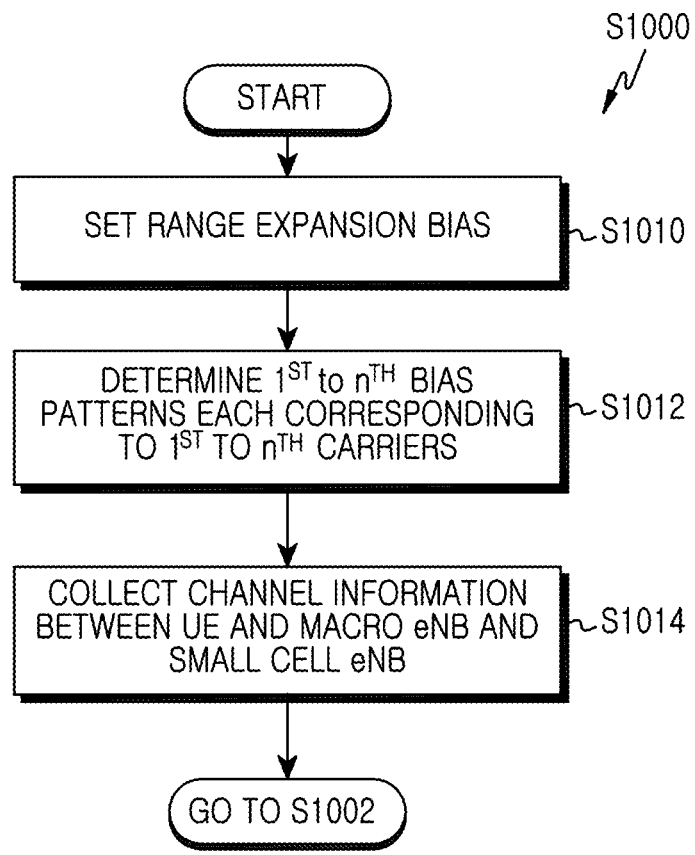
FIG. 8 is a flowchart illustrating a method for determining an ABS pattern having a different pattern by CC, according to an embodiment of the present invention illustrated in FIG. 7.

FIG. 8 is a flowchart illustrating a method for determining the ABS pattern having the different pattern for each CC, according to an embodiment of the present invention illustrated in FIG. 7.

When all different $1^{st}$ to $n^{th}$ carriers ('n' is a natural number greater than or equal to 2) are deployed in each of the macro eNB and the small cell eNBs, the coordinated scheduler sets a range expansion bias of the small cell eNB, in step S1010. For example, two carriers F1 and F2 may be deployed in each of the macro eNB and the small cell eNBs, as illustrated in FIG. 1, and three carriers F1, F2, and F3 may be deployed in each of the macro eNB and the small cell eNBs, as illustrated in FIG. 3. The numbers of the carriers deployed in each of the macro eNB and the small cell eNBs illustrated in FIGS. 1 and 3 are illustrative examples, and the number of the carriers may increase or decrease according to need.

The range expansion bias is a value for giving a positive offset to DL RSS of the small cell eNB, and enabling UEs receiving stronger DL RSS from the macro eNB but being located closer to the small cell eNB to be connected to the small cell eNB. This range expansion bias may be set based on the coverage of the macro eNB, the number of small cell eNBs located in a macro cell of the macro eNB, transmission power of the macro eNB and the small cell eNBs, or the like. Also, as the DL RSS for cell selection, an RSRP or an RSRQ may be used.

Referring back to FIG. 8, the coordinated scheduler determines $1^{st}$ to $n^{th}$ ABS patterns, each corresponding to the $1^{st}$ to $n^{th}$ carriers, in step S1012. The $1^{st}$ to $n^{th}$ ABS patterns are determined such that blank subframes of the $1^{st}$ to $n^{th}$ ABS patterns alternate with one another.

For example, if two carriers F1 and F2 are deployed in each of the macro eNB and the small cell eNBs, as illustrated in FIG. 1, the coordinated scheduler determines a $1^{st}$ ABS pattern of the carrier F1 and a $2^{nd}$ ABS pattern of the carrier F2 such that the $1^{st}$ ABS pattern and the $2^{nd}$ ABS pattern become patterns in which a subframe duration for transmitting data and a blank subframe duration for turning Off transmission power alternate with each other. That is, at the time of data transmission at the carrier F1 of the macro eNB, the carrier F2 of the macro eNB is set as a blank and, at the time of data transmission at the carrier F2 of the macro eNB, the carrier F1 of the macro eNB is set as a blank. As one example, the macro F1 carrier and the macro F2 carrier may be set to have ABSs alternating every subframe. The coordinated scheduler may fully turn off (blank) data transmission of the macro eNB during the blank subframe duration of the macro eNB, or may transmit data at low power.

As another example, if three carriers F1, F2, and F3 are deployed in each of the macro eNB and the small cell eNBs, as illustrated in FIG. 3, the coordinated scheduler determines a $1^{st}$ ABS pattern of the carrier F1, a $2^{nd}$ ABS pattern of the carrier F2, and a $3^{rd}$ ABS pattern of the carrier F3, such that the $1^{st}$ ABS pattern, the $2^{nd}$ ABS pattern, and the $3^{rd}$ ABS pattern become patterns in which a subframe duration for transmitting data and a blank subframe duration for turning Off data transmission alternate with each other. That is, at the time of data transmission at the carrier F1 of the macro eNB, the carrier F2 and/or carrier F3 of the macro eNB may be set as blank, or at the time of data transmission at the carrier F1 and carrier F2 of the macro eNB, the carrier F3 of the macro eNB may be set as a blank. As one example, the ABS patterns of the macro carriers may be set as (1, Off, On, On), (2, On, Off, On), and (3, On, On, Off) of (TTI, macro F1 carrier, macro F2 carrier, macro F3 carrier). The coordinated scheduler may fully turn off (blank) data transmission of the macro eNB during the blank subframe duration of the macro eNB, or may transmit data at low power.

Referring back to FIG. 8, the coordinated scheduler or the macro eNB collects channel information between the UE and the macro eNB and channel information between the UE and the small cell eNB, in step S1014. The channel information includes channel RSS between the UE and the macro eNB, channel RSS between the UE and the small cell eNB, or the like. For the sake of the channel information collection, the macro eNB may be connected with the small cell eNB and the UE by an optic or Ethernet backhaul and the like.

Referring back to FIG. 7, after step S1000, the coordinated scheduler determines a serving cell of each UE among a macro cell or small cell for each CC, in step S1002. The serving cell is determined using the range expansion bias and the channel information. The UE is determined to be located in a range expansion area of a small cell eNB expanded by the range expansion bias in accordance with Equation (1) above.

In Equation (1) above, the 'S' is a value for determining whether the UE is located within the range expansion area expanded by the range expansion bias of the small cell, if a received signal strength ($RSS_{Macro}$) from the macro cell is greater than a received signal strength ($RSS_{Small}$) from the small cell, but a value adding an offset to the received signal strength ($RSS_{Small}$) from the small cell is greater than the received signal strength ($RSS_{Macro}$) from the macro cell.

Accordingly, if the received signal strength ($RSS_{Macro}$) from the macro cell is greater than the received signal strength ($RSS_{Small}$) from the small cell, but the value adding the offset to the received signal strength ($RSS_{Small}$) from the small cell is greater than the received signal strength ($RSS_{Macro}$) from the macro cell, the coordinated scheduler determines the small cell to be a serving cell, and recognizes that the UE is located within the range expansion area expanded by the range expansion bias of the small cell. Also, if the received signal strength ($RSS_{Small}$) of the small cell is greater than the received signal strength ($RSS_{Macro}$) of the macro cell, the coordinated scheduler determines the small cell to be the serving cell, and recognizes that the UE is located within the original service area of the small cell. If the value adding the offset to the received signal strength ($RSS_{Small}$) from the small cell is less than the received signal strength ($RSS_{Macro}$) from the macro cell, the coordinated scheduler determines the macro cell to be the serving cell, and recognizes that the UE is located within a macro cell area.

Referring back to FIG. 7, the coordinated scheduler performs CA for data transmission to the UE in the macro eNB and the small cell eNB using the determined ABS patterns, in accordance to the determined serving cell, in step S1004.

Figure 9:
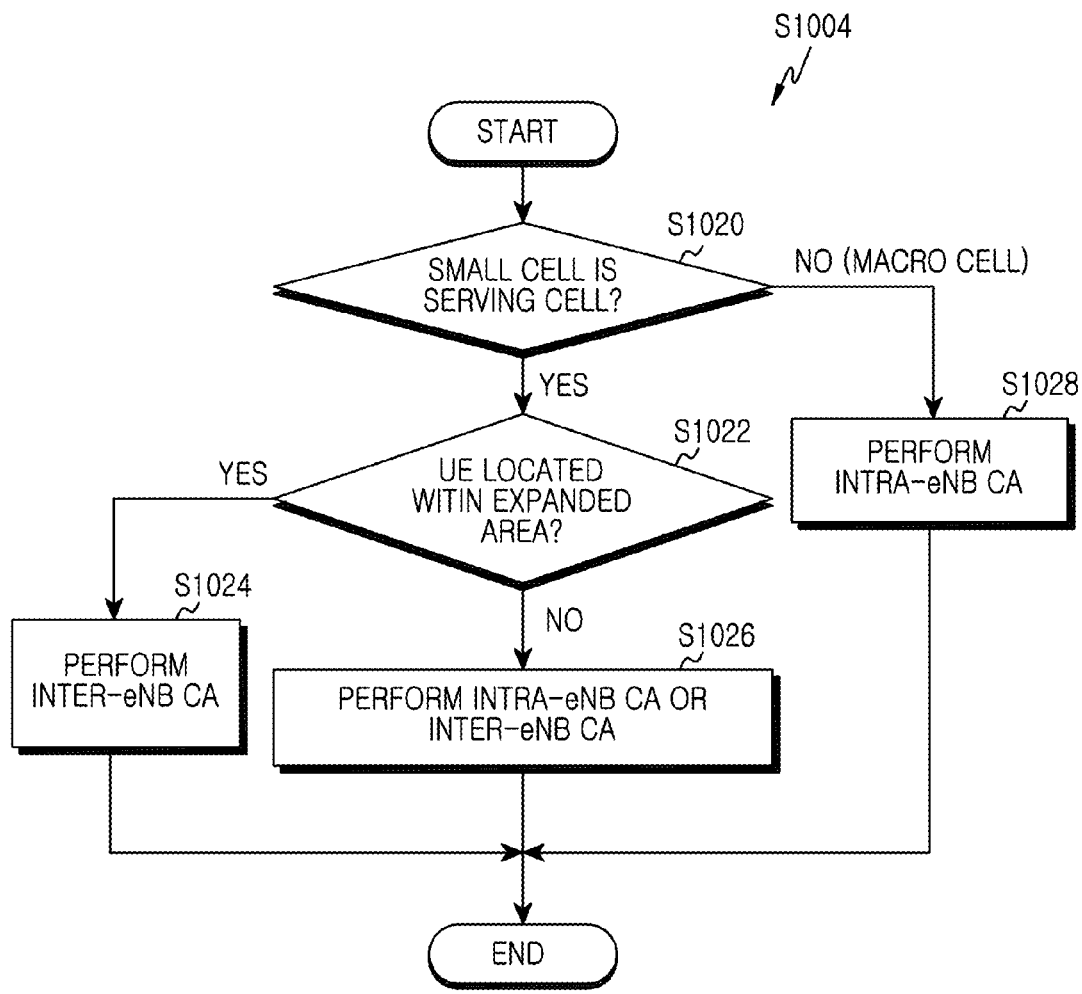
FIG. 9 is a flowchart illustrating a method for performing CA, according to an embodiment of the present invention illustrated in FIG. 7.

FIG. 9 is a flowchart illustrating a method for performing CA, in accordance with an embodiment of the present invention illustrated in FIG. 7.

The coordinated scheduler determines if the small cell is the serving cell, in step S1020.

If it is determined that the small cell is the serving cell, the coordinated scheduler determines if the UE is located within the range expansion area of the small cell, in step S1022.

If the UE is located within the range expansion area of the small cell, the coordinated scheduler performs inter-eNB CA between the macro eNB and the small cell eNB, in step S1024. The inter-eNB CA represents CA between non-colocated eNBs. The inter-eNB CA of embodiments of the present invention is that the macro eNB and the small cell eNB transmit data to the UE through the $1^{st}$ to $n^{th}$ carriers of the macro eNB and small cell eNB in accordance to the $1^{st}$ to $n^{th}$ ABS patterns of the macro eNB and small cell eNB.

For example, as illustrated in FIG. 1, the inter-eNB CA represents CA between the carrier F1 of the macro eNB and the carrier F2 of the small cell eNB with respect to the UE located in the range expansion area of the small cell, or represents CA between the carrier F2 of the macro eNB and the carrier F1 of the small cell eNB. That is, when the carrier F1 of the macro eNB is the blank subframe duration, the coordinated scheduler transmits data to the UE through the carrier F2 of the macro eNB and concurrently transmits data to the UE through the carrier F1 of the small cell eNB. When the carrier F2 of the macro eNB is the blank subframe duration, the coordinated scheduler transmits data to the UE through the carrier F1 of the macro eNB and concurrently transmits data to the UE through the carrier F2 of the small cell eNB.

Also, as illustrated in FIG. 3, the inter-eNB CA represents CA between the carriers F1 and F2 of the macro eNB and the carrier F3 of the small cell eNB with respect to the UE located in the range expansion area of the small cell, or represents CA between the carriers F1 and F3 of the macro eNB and the carrier F2 of the small cell eNB, or represents CA between the carriers F2 and F3 of the macro eNB and the carrier F1 of the small cell eNB. That is, when the carrier F3 of the macro eNB is the blank subframe duration, the coordinated scheduler transmits data to the UE through the carriers F1 and F2 of the macro eNB and concurrently transmits data to the UE through the carrier F3 of the small cell eNB. When the carrier F2 of the macro eNB is the blank subframe duration, the coordinated scheduler transmits data to the UE through the carriers F1 and F3 of the macro eNB and concurrently transmits data to the UE through the carrier F2 of the small cell eNB. When the carrier F1 of the macro eNB is the blank subframe duration, the coordinated scheduler transmits data to the UE through the carriers F2 and F3 of the macro eNB and concurrently transmits data to the UE through the carrier F1 of the small cell eNB.

Referring back to FIG. 9, if it is determined that the UE is located within the original cell area of the small cell eNB, and not the range expansion area of the small cell eNB in operation S1022, the coordinated scheduler performs intra-eNB CA for the data transmission to the UE in the small cell eNB or performs inter-eNB CA for the data transmission to the UE between the macro eNB and the small cell eNB, in step S1026. The inter-eNB CA for the data transmission to the UE between the macro eNB and the small cell eNB is the same as the inter-eNB CA of step S1024.

Performing the intra-eNB CA in the small cell eNB is transmitting the data to the UE through the $1^{st}$ to $n^{th}$ carriers of the small cell eNB. For example, as illustrated in FIG. 1, the coordinated scheduler performs CA between the carrier F1 and carrier F2 of the small cell eNB. Also, as illustrated in FIG. 3, the coordinated scheduler performs CA among the carrier F1, carrier F2, and carrier F3 of the small cell eNB.

If it is determined that the small cell is not the serving cell in step S1020, the coordinated scheduler performs intra-eNB CA for data transmission to the UE in the macro eNB, in step S1028. Performing the intra-eNB CA in the macro eNB is transmitting the data to the UE through the $1^{st}$ to $n^{th}$ carriers of the macro eNB in accordance to the $1^{st}$ to $n^{th}$ ABS patterns. For example, as illustrated in FIG. 1, the intra-eNB CA represents CA between the small cell F1 carrier and the small cell F2 carrier with respect to a UE located in a small cell area. Also, as illustrated in FIG. 3, when the carrier F1 of the macro eNB is the blank subframe duration, the coordinated scheduler transmits data to the UE through the carriers F2 and F3 of the macro eNB. When the carrier F2 of the macro eNB is the blank subframe duration, the coordinated scheduler transmits data to the UE through the carriers F1 and F3 of the macro eNB. When the carrier F3 of the macro eNB is the blank subframe duration, the coordinated scheduler transmits data to the UE through the carriers F1 and F2 of the macro eNB.

Figure 10:
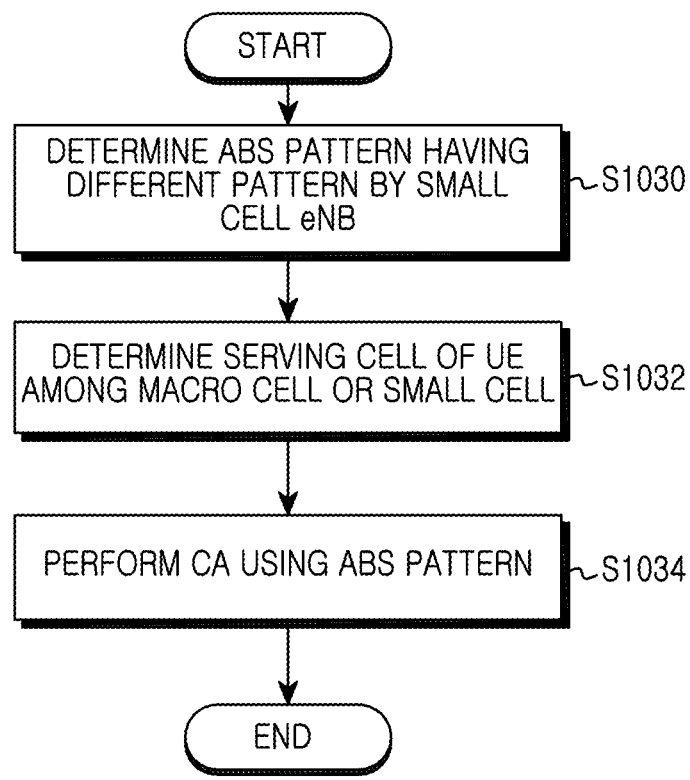
FIG. 10 is a flowchart illustrating a method for performing CA using a plurality of ABS patterns in a macro eNB of a wireless communication system connected to a HetNet, according to an embodiment of the present invention.

FIG. 10 is a flowchart illustrating a method for performing CA using a plurality of ABS patterns in a macro eNB of a wireless communication system connected to a HetNet, according to an embodiment of the present invention.

When different carriers are deployed in each of a macro eNB and at least one or more small cell eNBs, a coordinated scheduler or the macro eNB determines an ABS pattern having a different pattern by small cell eNB, in step S1030. The coordinated scheduler may be comprised in the macro eNB, or may be network node which manages a plurality of eNBs.

Figure 11:
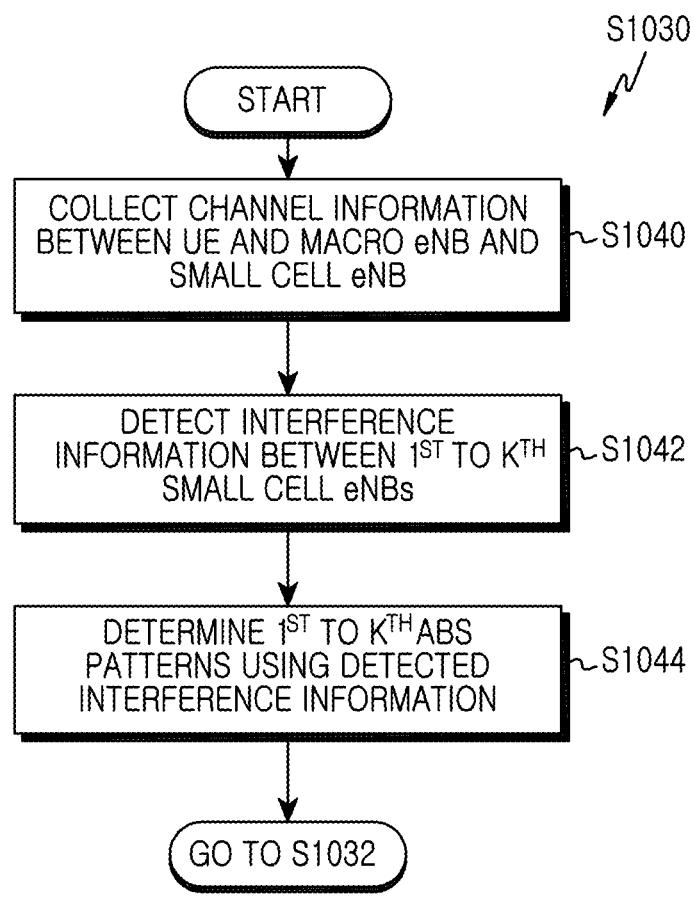
FIG. 11 is a flowchart illustrating a method for determining an ABS pattern having a different pattern by small cell eNB, according to an embodiment of the present invention illustrated in FIG. 10.

FIG. 11 is a flowchart illustrating a method for determining the ABS pattern having the different pattern by small cell eNB, according to an embodiment of the present invention illustrated in FIG. 10.

When a $1^{st}$ carrier is deployed in the macro eNB and a $2^{nd}$ carrier different from the $1^{st}$ carrier is deployed in each of $1^{st}$ to $k^{th}$ small cell eNBs ('k' is a natural number greater than or equal to 2), the coordinated scheduler collects channel information between a UE and the macro eNB and channel information between the UE and the $1^{st}$ to $k^{th}$ small cell eNBs, respectively, in step S1040. The channel information includes channel RSS between the UE and the macro eNB, channel RSS between the UE and the small cell eNB, or the like. For the sake of the channel information collection, the master macro eNB may be connected with the small cell eNB and the UE by an optic or Ethernet backhaul and the like.

The coordinated scheduler detects each interference information of the $1^{st}$ to $k^{th}$ small cell eNBs about the UE, using the collected channel information, in step S1042. Here, the coordinated scheduler detects small cell eNBs inducing dominant interference in the UE as the interference information in consideration of load information of the $1^{st}$ to $k^{th}$ small cell eNBs, the number of served UEs, and interference situations of the neighbor small cell eNBs. That is, the coordinated scheduler detects the small cell eNBs inducing dominant interference in the UE accessing each of the small cell eNBs.

The coordinated scheduler determines $1^{st}$ to $k^{th}$ ABS patterns each corresponding to the $1^{st}$ to $k^{th}$ small cell eNBs, using the detected interference information, in step S1044. The $1^{st}$ to $k^{th}$ ABS patterns are determined such that blank subframes of the $1^{st}$ to $k^{th}$ ABS patterns among small cells inducing mutual dominant interference among small cells of the $1^{st}$ to $k^{th}$ small cell eNBs alternate with one another.

The $1^{st}$ to $k^{th}$ ABS patterns each corresponding to the $1^{st}$ to $k^{th}$ small cell eNBs are adaptively applied in accordance to load information of own small cell, the number of respective served UEs, and interference situations of neighbor small cells. The $1^{st}$ to $k^{th}$ ABS patterns among the small cells inducing dominant interference are determined to maximally alternate with one another. Accordingly, the coordinated scheduler sets ABS patterns between own small cell and the neighbor small cell inducing interference maximally alternating with each other, thereby minimizing mutual interference. In accordance with an embodiment of the present invention, the coordinated scheduler may transmit data at low power without fully turning off (blanking) data transmission of the small cell eNBs at a small cell blank subframe.

For example, if a $1^{st}$ carrier F1 is deployed in a macro eNB and a $2^{nd}$ carrier F2 is deployed in each of three small cell eNBs, as illustrated in FIG. 5, the coordinated scheduler determines a $1^{st}$ ABS pattern for the $1^{st}$ small cell eNB deploying the carrier F2, and determines a $2^{nd}$ ABS pattern for the $2^{nd}$ small cell eNB deploying the carrier F2, and determines a $3^{rd}$ ABS pattern for the $3^{rd}$ small cell eNB deploying the carrier F2. The $1^{st}$ to $3^{rd}$ ABS patterns are determined such that blank subframes of the $1^{st}$ to $3^{rd}$ ABS patterns among small cells inducing mutual dominant interference among small cells of the $1^{st}$ to $3^{rd}$ small cell eNBs alternate with one another.

Referring back to FIG. 10, the coordinated scheduler or the macro eNB determines a serving cell of a UE among a macro cell or a small cell, in step S1032. The serving cell is determined using the channel information.

If a received signal strength ($RSS_{Small}$) from the small cell is greater than a received signal strength ($RSS_{Macro}$) from the macro cell, the coordinated scheduler determines the small cell to be the serving cell, and recognizes that the UE is located within the original service area of the small cell. If the received signal strength ($RSS_{Small}$) from the small cell is less than the received signal strength ($RSS_{Macro}$) from the macro cell, the coordinated scheduler determines the macro cell to be the serving cell, and recognizes that the UE is located within a macro cell area.

The coordinated scheduler performs CA for data transmission to the UE in the macro eNB and the small cell eNB using the determined ABS patterns, in accordance with the determined serving cell, in step S1034.

Figure 12:
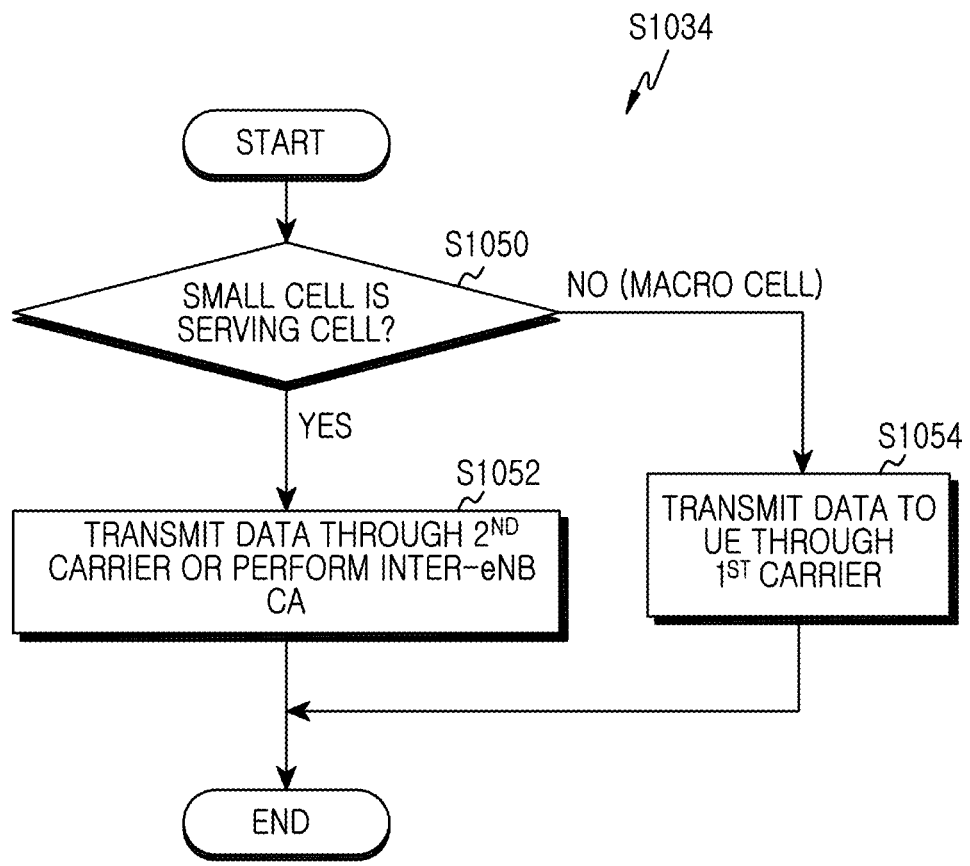
FIG. 12 is a flowchart illustrating a method for performing CA, according to an embodiment of the present invention illustrated in FIG. 10.

FIG. 12 is a flowchart illustrating a method of performing CA, according to an embodiment of the present invention illustrated in FIG. 10.

The coordinated scheduler determines whether a small cell of the $i^{th}$ small cell eNB ('i' is a natural number greater than or equal to 1, and equal to or less than 'k') is the serving cell, in step S1050.

If the small cell of the $i^{th}$ small cell eNB is the serving cell, the coordinated scheduler transmits the data to the UE through the $2^{nd}$ carrier of the $i^{th}$ small cell eNB, or performs inter-eNB CA for the data transmission to the UE between the macro eNB and the $i^{th}$ small cell eNB, in step S1052. For example, as illustrated in FIG. 5, the coordinated scheduler transmits data to the UE through the $2^{nd}$ carrier F2 of the $2^{nd}$ small cell eNB.

The coordinated scheduler may also perform inter-eNB CA for the data transmission to the UE between the macro eNB and the $i^{th}$ small cell eNB. The inter-eNB CA represents CA between non-colocated eNBs. In inter-eNB CA of embodiments of the present invention, the macro eNB and the $i^{th}$ small cell eNB transmit data to the UE through the $1^{st}$ to $2^{nd}$ carriers of the macro eNB and $i^{th}$ small cell eNB. For example, as illustrated in FIG. 5, the coordinated scheduler performs CA between a $1^{st}$ carrier F1 of the macro eNB and a $2^{nd}$ carrier F2 of the $1^{st}$ small cell eNB with respect to a UE located in a cell area of the $1^{st}$ small cell eNB in the $1^{st}$ small cell eNB. The $1^{st}$ small cell eNB transmits data to the UE using the $2^{nd}$ carrier F2 according to the $1^{st}$ ABS pattern of the $1^{st}$ small cell eNB.

Referring back to FIG. 12, if it is determined that the small cell is not the serving cell in step S1050, the coordinated scheduler transmits data to the UE through the $1^{st}$ carrier of the macro eNB, in step S1054.

Figure 13:
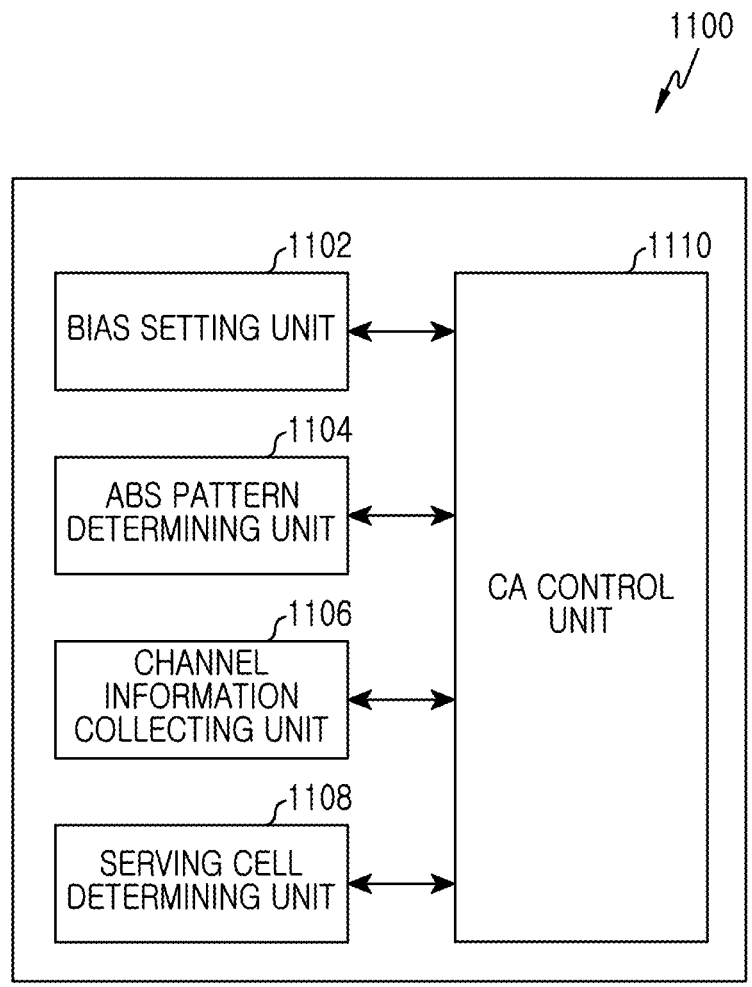
FIG. 13 is a block diagram illustrating an apparatus for performing CA using a plurality of ABS patterns in a macro eNB of a wireless communication system connected to a HetNet, according to an embodiment of the present invention.

FIG. 13 is a block diagram illustrating an apparatus for performing CA using a plurality of ABS patterns in a macro eNB of a wireless communication system connected to a HetNet, according to an embodiment of the present invention. An apparatus 1100 includes a bias setting unit 1102, an ABS pattern determining unit 1104, a channel information collecting unit 1106, a serving cell determining unit 1108, and a CA control unit 1110.

In FIG. 13, it is assumed that different $1^{st}$ to $n^{th}$ carriers ('n' is a natural number greater than or equal to 2) are all deployed in each of a macro eNB and at least one or more small cell eNBs.

The bias setting unit 1102 sets a range expansion bias of a small cell eNB. The bias setting unit 1102 sets the range expansion bias based on the coverage of the macro eNB, the number of small cell eNBs located in a cell area of the macro eNB, transmission power of the macro eNB and the small cell eNBs, and the like.

The ABS pattern determining unit 1104 determines $1^{st}$ to $n^{th}$ ABS patterns, each corresponding to the $1^{st}$ to $n^{th}$ carriers. The ABS pattern determining unit 1104 determines the 1st to $n^{th}$ ABS patterns such that blank subframes of the $1^{st}$ to $n^{th}$ ABS patterns alternate with one another.

For example, if two carriers F1 and F2 are deployed in each of the macro eNB and the small cell eNBs, as illustrated in FIG. 1, the ABS pattern determining unit 1104 determines a $1^{st}$ ABS pattern of the carrier F1 and a $2^{nd}$ ABS pattern of the carrier F2 such that the $1^{st}$ ABS pattern and the $2^{nd}$ ABS pattern become patterns in which a subframe duration for transmitting data and a blank subframe duration for turning Off transmission power alternate with each other. That is, the ABS pattern determining unit 1104 sets the carrier F2 of the macro eNB as a blank at the time of data transmission at the carrier F1 of the macro eNB, and the ABS pattern determining unit 1104 sets the carrier F1 of the macro eNB as a blank at the time of data transmission at the carrier F2 of the macro eNB.

If three carriers F1, F2, and F3 are deployed in each of the macro eNB and the small cell eNBs, as illustrated in FIG. 3, the ABS pattern determining unit 1104 determines a $1^{st}$ ABS pattern of the carrier F1, a $2^{nd}$ ABS pattern of the carrier F2, and a $3^{rd}$ ABS pattern of the carrier F3, such that the $1^{st}$ ABS pattern, the $2^{nd}$ ABS pattern, and the $3^{rd}$ ABS pattern become patterns in which a subframe duration for transmitting data and a blank subframe duration for turning Off data transmission alternate with one another. That is, the ABS pattern determining unit 1104 may set the carrier F2 and/or carrier F3 of the macro eNB as blank at the time of data transmission at the carrier F1 of the macro eNB, or may set the carrier F3 of the macro eNB as a blank at the time of data transmission at the carrier F2 and carrier F3 of the macro eNB. The ABS pattern determining unit 1104 may fully turn off (blank) data transmission of the macro eNB during the blank subframe duration of the macro eNB, or may transmit data at low power.

The channel information collecting unit 1106 collects channel information between a UE and the macro eNB and channel information between the UE and the small cell eNB. The channel information collecting unit 1106 collects channel RSS between the UE and the macro eNB, channel RSS between the UE and the small cell eNB, or the like, as the channel information. For the sake of the channel information collection and coordinated scheduling of the macro eNBs and the small cell eNBs, a coordinated scheduler or a macro eNB may be connected with all the macro eNBs and the small cell eNBs by an optic or Ethernet backhaul and the like.

The serving cell determining unit 1108 determines a serving cell of a UE among a macro cell or a small cell. The serving cell determining unit 1108 determines the serving cell using the range expansion bias and the channel information.

Using Equation (1) above, the serving cell determining unit 1108 determines whether the UE is located in the range expansion area of the small cell eNB expanded by the range expansion bias.

The CA control unit 1110 performs CA for data transmission to the UE in the macro eNB and the small cell eNB using the determined $1^{st}$ to $n^{th}$ ABS patterns, in accordance with the serving cell determined by the serving cell determining unit 1108.

If the small cell is the serving cell and the UE is located within the range expansion area of the small cell, the CA control unit 1110 performs inter-eNB CA between the macro eNB and the small cell eNB. The CA control unit 1110 controls to transmit data to the UE through the $1^{st}$ to $n^{th}$ carriers of the small cell eNB, in accordance to the $1^{st}$ to $n^{th}$ ABS patterns of the small cell eNB.

For example, as illustrated in FIG. 1, when the carrier F1 of the macro eNB is the blank subframe duration, the CA control unit 1110 controls to transmit data to the UE located in the range expansion area of the small cell through the carrier F2 of the macro eNB and concurrently transmits data to the UE through the carrier F1 of the small cell eNB. When the carrier F2 of the macro eNB is the blank subframe duration, the CA control unit 1110 controls to transmit data to the UE through the carrier F1 of the macro eNB, and concurrently transmit data to the UE through the carrier F2 of the small cell eNB.

Also, as illustrated in FIG. 3, when the carrier F3 of the macro eNB is the blank subframe duration, the CA control unit 1110 controls to transmit data to the UE located in the range expansion area of the small cell through the carriers F1 and F2 of the macro eNB, and concurrently transmits data to the UE through the carrier F3 of the small cell eNB. When the carrier F2 of the macro eNB is the blank subframe duration, the CA control unit 1110 controls to transmit data to the UE through the carriers F1 and F3 of the macro eNB, and concurrently transmits data to the UE through the carrier F2 of the small cell eNB. When the carrier F1 of the macro eNB is the blank subframe duration, the CA control unit 1110 controls to transmit data to the UE through the carriers F2 and F3 of the macro eNB, and concurrently transmit data to the UE through the carrier F1 of the small cell eNB.

If the UE is located within the original cell area of the small cell eNB, and not the range expansion area of the small cell, the CA control unit 1110 performs intra-eNB CA for the data transmission to the UE in the small cell eNB, or inter-eNB CA for the data transmission to the UE between the macro eNB and the small cell eNB. The inter-eNB CA for the data transmission to the UE between the macro cell eNB and the small cell eNB is the same as that described above.

In performing the intra-eNB CA in the small cell eNB, the CA control unit 1110 controls to transmit data to the UE through the $1^{st}$ to $n^{th}$ carriers of the small cell eNB. For example, as illustrated in FIG. 1, the CA control unit 1110 performs CA between the carrier F1 and carrier F2 of the small cell eNB. Also, as illustrated in FIG. 3, the CA control unit 1110 performs CA among the carrier F1, carrier F2, and carrier F3 of the small cell eNB.

If it is determined that the small cell is not the serving cell, the CA control unit 1110 performs intra-eNB CA for data transmission to the UE in the macro eNB. In performing the intra-eNB CA in the macro eNB, the CA control unit 1110 controls to transmit data to the UE through the $1^{st}$ to $n^{th}$ carriers of the macro eNB in accordance to the $1^{st}$ to $n^{th}$ ABS patterns of the macro eNB.

For example, as illustrated in FIG. 1, when the carrier F1 of the macro eNB is the blank subframe duration, the CA control unit 1110 controls to transmit data to a UE through the carrier F2 of the macro eNB. When the carrier F2 of the macro eNB is the blank subframe duration, the CA control unit 1110 controls to transmit data to the UE through the carrier F1 of the macro eNB. Also, as illustrated in FIG. 3, when the carrier F1 of the macro eNB is the blank subframe duration, the CA control unit 1110 controls to transmit data to a UE through the carriers F2 and F3 of the macro eNB. When the carrier F2 of the macro eNB is the blank subframe duration, the CA control unit 1110 transmits data to the UE through the carriers F1 and F3 of the macro eNB. When the carrier F3 of the macro eNB is the blank subframe duration, the CA control unit 1110 transmits data to the UE through the carriers F1 and F2 of the macro eNB.

Figure 14:
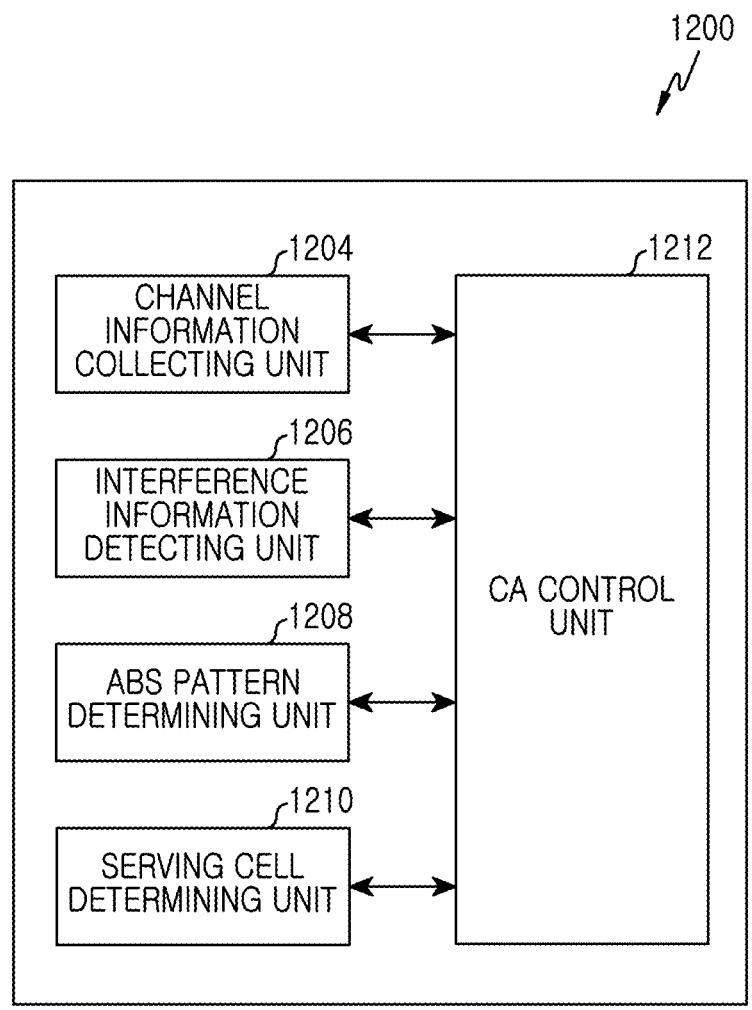
FIG. 14 is a block diagram illustrating an apparatus for performing CA using a plurality of ABS patterns in a macro eNB of a wireless communication system connected to a HetNet, according to another embodiment of the present invention.

FIG. 14 is a block diagram illustrating an apparatus for performing CA using different ABS patterns of small cell eNBs of a wireless communication system connected to a HetNet, according to another embodiment of the present invention. An apparatus 1200 includes a channel information collecting unit 1204, an interference information detecting unit 1206, an ABS pattern determining unit 1208, a serving cell determining unit 1210, and a CA control unit 1212.

In FIG. 14, it is assumed that a $1^{st}$ carrier is deployed in a macro eNB, and a $2^{nd}$ carrier, different from the $1^{st}$ carrier, is deployed in each of $1^{st}$ to $k^{th}$ small cell eNBs ('k' is a natural number greater than or equal to 2).

The channel information collecting unit 1204 collects channel information between a UE and the macro eNB, and channel information between the UE and the small cell eNB. The channel information collecting unit 1204 collects channel RSS between the UE and the macro eNB, channel RSS between the UE and the small cell eNB, or the like, as the channel information. For the sake of the channel information collection and coordinated scheduling of the macro eNBs and the small cell eNBs, a coordinated scheduler or a macro eNB may be connected with all the macro eNBs and the small cell eNBs by an optic or Ethernet backhaul and the like.

The interference information detecting unit 1206 detects interference information of each of the $1^{st}$ to $k^{th}$ small cell eNBs about the UE, using the channel information collected in the channel information collecting unit 1204. The interference information detecting unit 1206 detects, as the interference information, the small cell eNBs inducing dominant interference in the UE in consideration of load information of the $1^{st}$ to $k^{th}$ small cell eNBs, the number of served UEs, and interference situations of the neighbor small cell eNBs. That is, the interference information detecting unit 1206 detects the small cell eNBs inducing dominant interference in the UE accessing each of the small cell eNBs.

The ABS pattern determining unit 1208 determines $1^{st}$ to $k^{th}$ ABS patterns having different patterns by $1^{st}$ to $k^{th}$ small cell eNBs. The ABS pattern determining unit 1208 determines the $1^{st}$ to $k^{th}$ ABS patterns, such that blank subframes of the $1^{st}$ to $k^{th}$ ABS patterns among small cells inducing mutual dominant interference among small cells of the $1^{st}$ to $k^{th}$ small cell eNBs alternate with one another. The ABS pattern determining unit 1208 maximally alternates ABS patterns between its own small cell and small cells inducing interference, in accordance to load information of its own small cell, the number of respective served UEs, and interference situations of neighbor small cells. Accordingly, the ABS pattern determining unit 1208 sets ABS patterns between its own small cell and the small cell inducing interference maximally alternating with each other, thereby minimizing mutual interference. In accordance with an embodiment of the present invention, a coordinated scheduler or a macro eNB may also transmit data at low power without fully turning Off (blanking) data transmission of the small cell eNBs at a small cell blank subframe.

For example, if a $1^{st}$ carrier F1 is deployed in a macro eNB and a $2^{nd}$ carrier F2 is deployed in each of three small cell eNBs as illustrated in FIG. 5, the ABS pattern determining unit 1208 determines a $1^{st}$ ABS pattern for the $1^{st}$ small cell eNB deploying the carrier F2, determines a $2^{nd}$ ABS pattern for the $2^{nd}$ small cell eNB deploying the carrier F2, and determines a $3^{rd}$ ABS pattern for the $3^{rd}$ small cell eNB deploying the carrier F2. The $1^{st}$ to $3^{rd}$ ABS patterns are determined such that blank subframes of the $1^{st}$ to $3^{rd}$ ABS patterns among small cells inducing mutual dominant interference among small cells of the $1^{st}$ to $3^{rd}$ small cell eNBs alternate with one another.

The serving cell determining unit 1210 determines a serving cell of a UE among a macro cell and a small cell. The serving cell determining unit 1210 determines the serving cell using the channel information. If a received signal strength ($RSS_{Small}$) from the small cell is greater than a received signal strength ($RSS_{Macro}$) from the macro cell, the serving cell determining unit 1210 determines the small cell to be the serving cell, and recognizes that the UE is located within a service area of the small cell. Also, if the received signal strength ($RSS_{Small}$) from the small cell is less than the received signal strength ($RSS_{Macro}$) from the macro cell, the serving cell determining unit 1210 determines the macro cell to be the serving cell, and recognizes that the UE is located within a macro cell area.

The CA control unit 1212 performs CA for data transmission to the UE in the macro eNB and the small cell eNB using the determined $1^{st}$ to $k^{th}$ ABS patterns, in accordance with the serving cell determined in the serving cell determining unit 1210.

If it is determined that the UE is a UE located in a cell area of the $i^{th}$ small cell eNB, the CA control unit 1212 controls to transmit data to the UE through the $2^{nd}$ carrier of the $i^{th}$ small cell eNB, or performs inter-eNB CA for the data transmission to the UE between the macro eNB and the $i^{th}$ small cell eNB. For example, as illustrated in FIG. 5, the CA control unit 1212 controls to transmit data to the UE through the $2^{nd}$ carrier F2 of the $2^{nd}$ small cell eNB. Inter-eNB CA for the data transmission to the UE between the macro eNB and the $i^{th}$ small cell eNB is the same as that described above. That is, the CA control unit 1212 performs CA between the $1^{st}$ carrier F1 of the macro eNB and the $2^{nd}$ carrier F2 of the $1^{st}$ small cell eNB. The $1^{st}$ small cell eNB transmits data to the UE using the $2^{nd}$ carrier F2 of the $1^{st}$ small cell eNB in accordance with the $1^{st}$ ABS pattern of the $1^{st}$ small cell eNB If it is determined that the small cell of the $i^{th}$ small cell eNB is not the serving cell, the CA control unit 1212 transmits data to the UE through the $1^{st}$ carrier of the macro eNB.

For example, as illustrated in FIG. 5, the CA control unit 1212 transmits data to the UE through the $2^{nd}$ carrier F2 of the $3^{rd}$ small cell eNB.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of an enhanced node B (eNB), with a macro cell in a wireless communication system comprising the macro cell and a small cell included in the macro cell, the method comprising:
    determining a first almost blank subframe (ABS) pattern for a first component carrier (CC), and a second ABS pattern for a second CC, wherein the second ABS pattern is different from the first ABS pattern;
    determining whether a serving cell for a user equipment (UE) is configured with the macro cell or both the macro cell and the small cell,
    if the serving cell of the UE is configured with the macro cell, transmitting, to the UE, first data on the first CC by using the first ABS pattern and transmitting, to the UE, second data on the second, CC by using the second ABS pattern; and
    if the serving cell of the UE is configured with both the macro cell and the small cell, controlling another eNB with the small cell to transmit, to the UE, the second data on the second CC by using the second ABS pattern.

2. The method of claim 1, wherein a subframe duration for transmitting data and a subframe duration for terminating transmission of the data included in each of the first ABS pattern and the second ABS pattern are located across each other.

3. The method of claim 1, further comprising:
    performing a range expansion bias of the small cell enabling the UE receiving the data from the eNB and the another eNB simultaneously, based on coverage of the macro cell and a transmission power of the eNB and the another eNB.

4. The method of claim 3, further comprising:
    collecting channel information between the UE and the eNB, and between the UE and the another eNB,
    wherein the serving cell is determined based on the range expansion bias and the channel information.

5. The method of claim 3, further comprising:
    if the serving cell of the UE is configured with both the macro cell and the small cell, and if the range expansion bias of the small cell is applied to the UE, transmitting, to the UE, the first data on the first CC by using the first ABS pattern and controlling the another eNB to transmit the second data on the second CC by using the second ABS pattern to the UE; and
    if the serving cell of the UE is configured with both the macro cell and the small cell, and if the range expansion bias of the small cell is not applied to the UE, controlling the another eNB to transmit the first data on the first CC by using the first ABS pattern to the UE and controlling the another eNB to transmit, to the UE, the second data on the second CC by using the second ABS pattern.

6. The method of claim 3, wherein each of the first ABS pattern and the second ABS pattern further indicates a subframe duration for transmitting data at normal power and a subframe duration for transmitting data at low power.

7. An apparatus of an enhanced node B (eNB), with a macro cell in a wireless communication system comprising the macro cell and a small cell included in the macro cell, the apparatus comprising:
    a transceiver; and
    at least one processor configured to:
    determine a first almost blank subframe (ABS) pattern for a first component carrier (CC), and a second ABS pattern for a second CC, wherein the second ABS pattern is different from the first ABS pattern;
    determine whether a serving cell for a user equipment (UE) is configured with the macro cell or both the macro cell and the small cell,
    if the serving cell of the UE is configured with the macro cell, transmit, to the UE, first data on the first CC by using the first ABS pattern and transmit, to the UE, second data on the second CC by using the second ABS pattern; and
    if the serving cell of the UE is configured with both the macro cell and the small cell, control another eNB with the small cell to transmit, to the UE, the second data on the second CC by using the second ABS pattern.

8. The apparatus of claim 7, wherein a subframe duration for transmitting data and a subframe duration for terminating transmission of the data included in each of the first ABS pattern and the second ABS pattern are located across each other.

9. The apparatus of claim 7, wherein the at least one processor is further configured to:
    perform a range expansion bias of the small cell enabling the UE receiving the data from the eNB and the another eNB simultaneously, based on coverage of the macro cell and a transmission power of the eNB and the another eNB.

10. The apparatus of claim 9, wherein the at least one processor is further configured to:
    collect channel information between the UE and the eNB, and between the UE and the another eNB,
    wherein the serving cell is determined based on the range expansion bias and the channel information.

11. The apparatus of claim 9, wherein the at least one processor is further configured to:
    if the serving cell of the UE is configured with both the macro cell and the small cell, and if the range expansion bias of the small cell is applied to the UE, transmit, to the UE, the first data on the first CC by using the first ABS pattern and control the another eNB to transmit, to the UE, the second data on the second CC by using the second ABS pattern, and
    if the serving cell of the UE is configured with both the macro cell and the small cell, and if the range expansion bias of the small cell is not applied to the UE, control the another eNB to transmit, to the UE, the first data on the first CC by using the first ABS pattern and control the another eNB to transmit, to the UE, the second data on the second CC by using the second ABS pattern.

12. The apparatus of claim 9, wherein each of the first ABS pattern and the second ABS pattern further indicates a subframe duration for transmitting data at normal power and a subframe duration for transmitting data at low power.

13. A method of an enhanced node B (eNB), with a macro cell in a wireless communication system comprising the macro cell and a small cell included in the macro cell, the method comprising:
    determining a first almost blank subframe (ABS) pattern for a first component carrier (CC), and a second ABS pattern for a second CC, wherein the second ABS pattern is different from the first ABS pattern;
    determining, whether a serving cell for a user equipment (UE) is configured with the macro cell or both the macro cell and the small cell;
    if the serving cell of the UE is configured with the macro cell, transmitting, to the UE, first data on the first CC by using the first ABS pattern and transmitting, to the UE, second data on the second CC by using the second ABS pattern, and
    if the serving cell of the UE is configured with both the macro cell and the small cell, transmitting, to the UE, the first data on the first CC by using the first ABS pattern and controlling another eNB with the small cell to transmit, to the UE, the second data on the second CC by using the second ABS pattern.

14. The method of claim 13, wherein determining each of the first ABS pattern and the second ABS pattern comprises:
    collecting channel information between the UE and the eNB and collecting channel information between the UE and the another eNB with the small cell, when the first CC is deployed in the eNB and the second CC is deployed in the another eNB;
    detecting interference information of the another eNB about the UE, using the collected channel information; and
    determining the first ABS pattern and second ABS pattern using the detected interference information.

15. The method of claim 14, wherein determining each of the first ABS pattern and the second ABS pattern comprises determining each of the first ABS pattern and the second ABS pattern such that blank subframes of the first and second ABS patterns inducing mutual dominant interference.

16. An apparatus of an enhanced node B (eNB), with a macro cell in a wireless communication system comprising the macro cell and a small cell included in the macro cell, the method comprising:
    a transceiver; and
    at least one processor configured to:
        determine a first almost blank subframe (ABS) pattern for a first component carrier (CC), and a second ABS pattern for a second CC, wherein the second ABS pattern is different from the first ABS pattern;
        determine whether a serving cell for a user equipment (UE) is configured with the macro cell or both the macro cell and the small cell;
        if the serving cell of the UE is configured with the macro cell, transmit, to the UE, first data on the first CC by using the first ABS pattern and transmit, to the UE, second data on the second CC by using the second ABS pattern; and
        if the serving cell of the UE is configured with both the macro cell and the small cell, transmit, to the UE, the first data on the first CC by using the first ABS pattern and control another eNB with the small cell to transmit, to the UE, the second data on the second CC by using the second ABS pattern.

17. The apparatus of claim 16, wherein the at least one processor is further configured to:
    collect channel information between the UE and the eNB and collect channel information between the UE and the another eNB with the small cell, when the first CC is deployed in the eNB and the second CC is deployed in the another eNB;
    detect interference information of the another eNB about the UE, using the collected channel information; and
    determine the first ABS pattern and second ABS pattern using the detected interference information.

18. The apparatus of claim 17, wherein the at least one processor is further configured to determine each of the first ABS pattern and the second ABS pattern such that blank subframes of the first and second ABS patterns inducing mutual dominant interference.

* * * * *